United States Patent [19]

Osaki et al.

[11] Patent Number: 4,461,975

[45] Date of Patent: Jul. 24, 1984

[54] CONCEALED TYPE HEAD LAMP DEVICE

[75] Inventors: Hichiro Osaki; Kazumi Hayashi, both of Aichi, Japan

[73] Assignee: Toyota Jidosha Kogyo Kabushiki Kaisha, Toyota, Japan

[21] Appl. No.: 314,411

[22] Filed: Oct. 23, 1981

[30] Foreign Application Priority Data

Oct. 27, 1980 [JP] Japan ............................. 55-150428
Oct. 27, 1980 [JP] Japan ............................. 55-150429
Oct. 27, 1980 [JP] Japan ............................. 55-150430
Oct. 27, 1980 [JP] Japan ......................... 55-153145[U]

[51] Int. Cl.³ .................................. B60Q 1/02
[52] U.S. Cl. ............................. 315/82; 307/10 LS; 315/77; 315/83; 362/65
[58] Field of Search ................... 362/65, 63; 315/82, 315/83, 77; 307/10 LS

[56] References Cited

U.S. PATENT DOCUMENTS

| 2,662,605 | 12/1953 | Riggs | 362/65 |
| 2,795,772 | 6/1957 | Lothringen et al. | 362/65 X |
| 3,798,500 | 3/1974 | Florence et al. | 315/82 |
| 3,989,954 | 11/1976 | Weiner | 307/10 LS |
| 4,282,561 | 8/1981 | Yano | 362/65 |
| 4,284,903 | 8/1981 | Mutschler et al. | 307/10 LS |

FOREIGN PATENT DOCUMENTS

| 2715125 | 10/1978 | Fed. Rep. of Germany | 315/82 |
| 1564504 | 4/1980 | United Kingdom | 315/82 |

Primary Examiner—Saxfield Chatmon
Attorney, Agent, or Firm—Cushman, Darby & Cushman

[57] ABSTRACT

A concealed type head lamp device in which head lamps are provided on a motor vehicle body and are capable of performing exposed, concealed, turning on and off and passing operations by a plurality of switches driven by means of a single operating lever. The head lamp device has a delay circuit by which the head lamps are concealed after a predetermined period of time from turning off of the head lamps to prevent the head lamps from emitting a dazzling beam toward a facing vehicle. The head lamp device has also a temperature sensitive switch for measuring an ambient temperature of a motor vehicle whereby the head lamps are driven to be exposed when the ambient temperature is below a set level for preventing the lamp portions from being freezed.

9 Claims, 2 Drawing Figures

CONCEALED TYPE HEAD LAMP DEVICE

BACKGROUND OF THE INVENTION

1. Field of Invention

The present invention relates to a concealed type head lamp device in which head lamps concealed in a vehicle body are exposed only when the head lamps are turned on or lighted.

2. Prior Art

Concealed type head lamps provided on the vehicle are concealed in the vehicle body when they are turned off or unlighted and driven so as to be exposed from the body by means of a driving motor when they are turned on. With concealed type head lamp device, it is necessary to drive and control the head lamps and to control turning on and off the head lamps. To meet such a function, there has been proposed in the past a device wherein a single operating lever is used to control both the driving and lighting of the head lamps.

However, in this prior art device, when the head lamps are driven to be concealed from an exposed and turned on condition, the head lamps are concealed while not being turned off completely. If, during concealment, the projecting face of each head lamp is moved from a forward facing to an upward facing direction, there is a disadvantage that a dazzling beam is projected against a facing vehicle.

A further disadvantage is that the head lamps remain turned on whenever the head lamps are left exposed in order to prevent the lamps from freezing in a position in which they are not fully exposed or the head lamps are left exposed, for example, during car-washing.

In order to overcome these disadvantages as noted above, there has been proposed a device which is provided with an operating lever capable of controlling turning-on and driving the head lamps and an operating lever capable of controlling driving of the head lamps independently of the function of the first-mentioned operating lever. However, in case of the device as described, the disadvantages encountered in the first-mentioned device may be overcome but there involves an inconvenience in that controlling of turning on and off and driving the head lamps may not be carried out by means of a single operating lever, which is disadvantageous in terms of operation.

SUMMARY OF THE INVENTION

It is a primary object of the present invention to provide a concealed type head lamp device which can independently control turning on and off and driving the head lamps by operation of a single operating lever.

A further object of the present invention is to provide a concealed type head lamp device which can positively turn off the head lamps when the latter are shifted in state from the exposed state to the concealed state.

Another object of the present invention is to provide a concealed type head lamp device which can positively turn on the head lamps when the latter are shifted in state from the concealed state to the exposed state.

A still further object of the present invention is to provide a concealed type head lamp device which can be automatically driven to expose the head lamps before the latter are frozen.

Another object of the present invention is to provide a concealed type head lamp device which can effect a mode of operation by mere operation appropriate for when the vehicle is passing another vehicle of a single operating lever.

In order to achieve the above-described objects, the present invention provides an arrangement wherein a head lamp driving switch for changing over the head lamps to the concealed or exposed state is operatively connected with an operating switch, said operating switch being driven by means of a driving motor according to the operation of the operating switch representative of the specific state according to the control content and the drive content of the head lamps.

The present invention further provides a delay circuit for driving the head lamps to be concealed after a predetermined period of time upon the changeover of the operating switch to a mode which brings the head lamps into a turn on and concealed state or upon termination of passing operation.

The present invention provides a temperature sensitive switch for measuring an ambient temperature of a vehicle whereby the head lamps are driven to be exposed when the ambient temperature is below a set level.

BRIEF DESCRIPTION OF THE DRAWINGS

The above mentioned features and objects of the present invention will become more apparent with reference to the following description taken in conjunction with the accompanying drawings wherein like reference numerals denote like elements and in which.

DETAILED DESCRIPTION OF THE INVENTION

An embodiment of a concealed type head lamp device in accordance with the present invention will now be described in detail in conjunction with the accompanying drawings.

Figure 1:
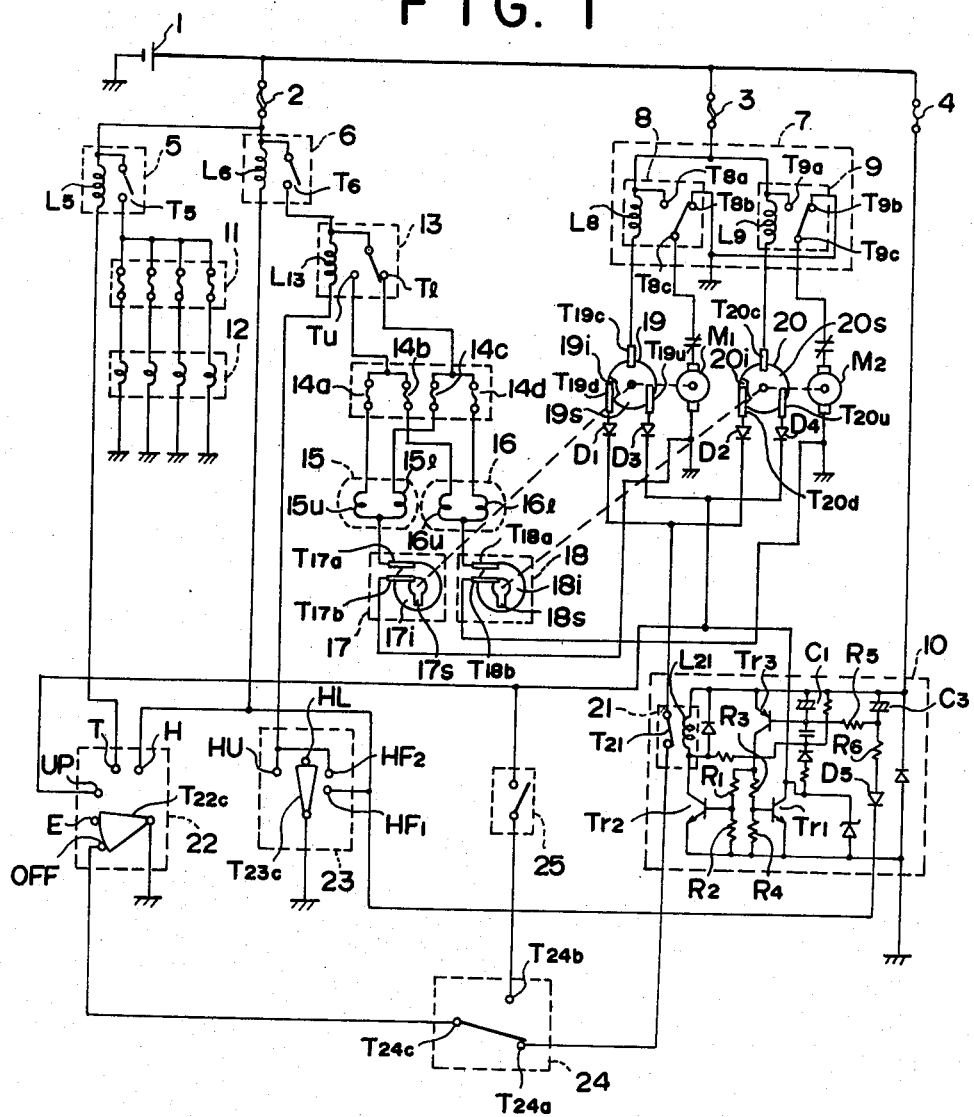
FIG. 1 is a circuit diagram showing an embodiment of a concealed type head lamp device in accordance with the present invention.

FIG. 1 is a circuit diagram of a concealed type head lamp device according to the present invention. Referring now to FIG. 1, fusible links 2, 3 and a fuse 4 are connected to a battery 1. The fusible link 2 is connected to a tail lamp relay 5 and a head lamp relay 6. The fusible link 3 is connected to brake relays 8, 9 of a light retractor relay 7. The fuse 4 is connected to a light retractor control relay circuit 10. A contact T5 of the tail lamp relay 5 is connected to a plurality of tail lamps 12 in the form of small lamps, such as side lamps, through a plurality of fuses 11. A normally open contact T6 of the head lamp relay 6 is connected to a dimmer relay 13. A contact Tu of the dimmer relay 13 is connected, through fuses 14a and 14b, to high-beam lamps 15u and 16u of head lamps 15 and 16, which are located on left and right sides at the front of a vehicle, driven to be concealed or exposed by means of a driving motor. Contact Tl is connected, through fuses 14c and 14d, to low-beam lamps 15l and 16l of the head lamps 15 and 16. The lamps 15u, 15l and 16u, 16l are respectively connected to contacts T17a, T18a of light switches 17, 18 housed in the driving motor, which will be described later. Contacts T17b and T18b normally in contact with conductive sliding plates 17s and 18s driven by the driving motor are grounded. The contacts T17a and T18a are respectively in contact with insulating portions 17i and 18i as viewed in FIG. 1. The brake relays 8 and 9 for controlling the rotation of the driving motor have contacts T8c and T9c as a common contact. The contact T8c is connected to a driving motor M1 by which the head lamp 15 is driven to be concealed or exposed, whereas the contact T9c is connected to a driving motor M2 by which the head lamp 16 is driven to be concealed or exposed. An exciting coil L8 of the relay 8 and an exciting coil L9 of the relay 9 are respectively connected to contacts T19c and T20c as a common contact of retractor switches 19 and 20 housed in the driving motors M1 and M2. Contacts T8a and T9a of the relays 8 and 9 are respectively connected to the exciting coils L8 and L9, contacts T8b and T9b thereof being grounded. Insulating portions 19i and 20i of the retractor switches 19 and 20 are rotated half (180°) with sliding plates 19s and 20s by one operation of the retractor motors M1 and M2. The sliding plates 17s and 18s, which are provided on the light switches 17 and 18, respectively, housed in the motor devices, are also driven and rotated half by means of the driving motors M1 and M2. Down contact T19d and T20d provided on the retractor switches 19 and 20 are respectively connected to anodes of diodes D1 and D2. Cathodes of the diodes D1 and D2 are connected in common and then connected to a normally closed contact T21 of a relay 21 within the light retractor control relay circuit 10. Further, output of the normally closed contact T21 is connected to a contact "OFF" of a lighting switch 22. "UP" contacts T19u and T20u provided on the retractor switches 19 and 20, respectively, are connected to anodes of diodes D3 and D4. Cathodes of the diodes D3 and D4 are connected in common and then connected to the "UP" contacts of the lighting switch 22 and connected to the light retractor control relay circuit 10. Contact "T" of the lighting switch 22 is connected to the exciting coil L5 of the tail lamp relay 5, and contact "H" thereof is connected to the exciting coil L6 of the head lamp relay 6, a diode D5 of the light retractor control relay circuit 10, and a contact "HF1" of a dimmer switch 23. The lighting switch 22 is designed so that when a lighting operating lever not shown is switched to positions indicated in order of "OFF", "UP", "T" and "H", a contact tongue T22c with the lighting switch 22 grounded thereto comes into contact therewith every two contacts. That is, when the lighting operating lever is switched to the position "OFF", the contact tongue T22c comes into contact with the contact "OFF" and contact "E", which is a dead contact, and when the operating lever is rotated one step, the contact "E" comes into contact with the contact "UP". In this manner, when the lighting operating lever is switched to "T", the contact "UP" comes into contact with the contact "T". When the operating lever is switched to the position "H", the contact tongue T22c comes into contact with the contact "UP", contact "T", and the contact "T", contact "H".

The dimmer switch 23 is designed so that when a dimmer operating lever not shown is switched to positions indicated as at "HU", "HL", "HF", "HF2", and "HF1", a grounded contact tongue T23c comes into contact with the contact "HU", contact "HL", contact "HF1", and "HF2", respectively, corresponding to the aforesaid positions. The contacts "HU" and "HF2" are connected to the exciting coil L13 of the dimmer relay 13.

The light retractor control relay circuit 10 comprises a first switch circuit having a function to provide an interruption between the contact "UP" of the lighting switch 22 and a grounded point, a second switch circuit for controlling an exciting coil L21 of the relay 21 and peripheral circuits. The first switch circuit comprises a transistor Tr1 and a bias circuit, said bias circuit comprising a transistor Tr3, resistors R3 and R4. The second switch circuit comprises a transistor Tr2 connected to the exciting coil 21 and a bias circuit. The bias circuit comprises resistors R1 and R2 and a transistor Tr3. When the transistor Tr3 is energized, the resistors R1 and R3 are applied with a voltage. A base of the transistor Tr3 is connected to a power supply through a capacitor C1 and connected to a power supply through a series circuit which comprises a resistor R5 and a capacitor C3. A node between the resistor R5 and the capacitor C3 is connected to the contact "HF1" of the dimmer switch 23 through a resistor R6 and the diode D5.

In the light retractor control relay circuit 10, when the lighting switch 22 is at the contact "H" or when the operating lever in the dimmer switch 23 is at the contact "HF", the cathode of the diode D5 is grounded and a bias voltage is applied to the base of the transistor Tr3 by the resistors R5, R6 and capacitors C1, C3, as a consequence of which the transistor Tr3 is turned ON. As a result, a bias voltage is applied to the transistor Tr1 and Tr2 by the resistors R1, R2, R3 and R4, and therefore the transistors Tr1 and Tr2 are turned ON. When the transistor Tr2 is turned ON, the relay 21 is driven to open the contact T21. When the diode D5 is ungrounded, the transistor Tr3 remains in its ON condition for a predetermined period of time (about 2 to 4 seconds) by charged charges in the capacitors C1 and C3, and thus, the contact T21 of the relay 21 is closed after a lapse of a predetermined period.

Figure 2:
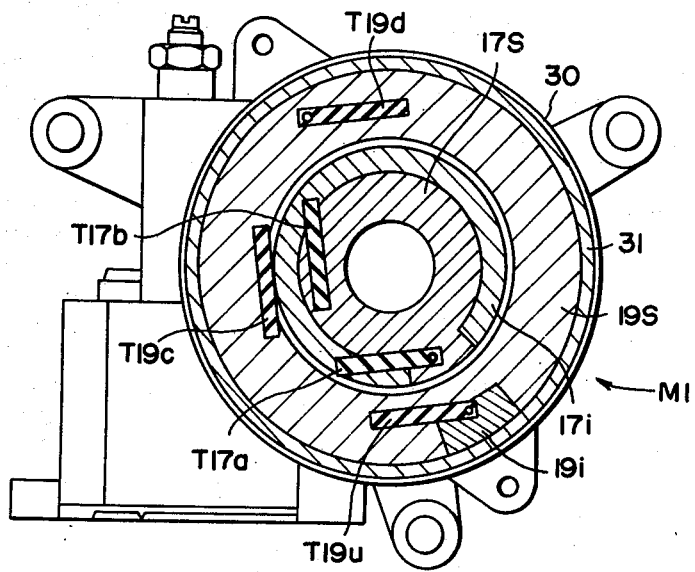
FIG. 2 is a sectional view showing a principal portion of a driving motor shown in FIG. 1.

FIG. 2 is a sectional view showing a principal portion of a driving motor shown in FIG. 1, showing the retractor switch portion and with the head lamp being exposed. Since the driving motor M1 has the same construction as that of the driving motor M2, the driving motor M1 alone will be described in FIG. 2. Parts in FIG. 2 which are like or corresponding to those shown in FIG. 1 bear like reference characters.

In FIG. 2, a gear portion 30 provided on the driving motor M1 is provided with a sliding plate 19s and a sliding plate 17s, which rotate integral with a gear 31. The gear 31 is a gear having a fixed ratio of reduction with respect to the gear for driving the head lamps 15, 16, which gear is rotated halfway when the head lamps 15, 16 are driven to be concealed or exposed by the driving motor M1. The sliding plate 19s is provided with an insulating portion 19i, and a contact T19c, a down contact T19d and an up contact T19u are arranged so as to come into contact with the sliding plate 19s or the insulating portion 19i. A contact T17b is arranged so as to come into contact with the sliding plate 17s at all times, and a contact T17a is arranged so as to come into contact with the sliding plate 17s or the insulating portion 17i. Non-contact sides of the above-described contacts are fixed by means of insulating members not shown.

The operation will now be described. First, in FIG. 1, there comprises two loop circuits; a first loop circuit comprising the battery 1, fusible link 3, coils L8 and L9 of the brake relays 8 and 9, contacts T19c and T20c of the retractor switches 19 and 20, down contacts T19d and T20d, diodes D1 and D2, contact T21, contact "OFF" and earth, and a second loop circuit comprising the battery 1, fusible link 3, coils L8 and L9 of the brake relays 8 and 9, contacts T19c and T20c of the retractor switches 19 and 20, up contacts T19u and T20u, diodes D3 and D4, contact UP and earth. However, when the lighting operating lever is at "OFF", the dimmer operating lever is at the position "HL" and the head lamps 15 and 16 are concealed, the down contacts T19d and T20d are in contact with the insulating portions 19i and 20i, and therefore, the first loop circuit is cut off, and the contact "UP" is open and therefore the second loop is also cut off. In this condition, since the driving motors M1 and M2 are not actuated, the head lamps 15 and 16 remain concealed. Also, since the circuits for the tail lamp 12 and the head lamps 15, 16 are cut off, the tail lamp 12 and the head lamps 15, 16 are unlighted.

Next, when the lighting operating lever is switched to the "UP" position, the contact UP is grounded and accordingly, the second loop circuit is energized. Thus, the brake relays 8 and 9 are actuated, and the contacts T8c and T9c are switched towards the contacts T8a and T9a. Therefore, the driving motors M1 and M2 start and the head lamps 15 and 16 are exposed in a 0.6 seconds or so. At the same time, the sliding plates 19s and 20s and the sliding plates 17s and 18s are rotated halfway to cause the insulating portions 19i and 20i to come into contact with the up contacts T19u and T20u, respectively, and to cause the sliding plates 17s and 18s to come into contact with the contact T17a and T18a, respectively. When the up contacts T19u and T20u come into contact with the insulating portions 19i and 20i, respectively, the aforementioned second loop circuit is deenergized so that the contacts T8c and T9c are switched towards the contacts T8b and T9, respectively, whereby the driving motors M1 and M2 stop their operation. Incidentally, the sliding plates 17s and 18s are in contact with the contacts T17a and T18a, respectively, but in this condition, the head lamp relay 6 is not actuated and thus the head lamps 15 and 16 remain unlighted. Also, since the tail lamp relay 5 is not actuated, the tail lamp 12 remains unlighted.

Next, when the lighting operating lever is switched to the "T" position, the contact "UP" and the contact "T" are grounded. This actuates the tail lamp relay 5 to light the tail lamp 12. Since the head lamp relay 6 is not actuated in this condition, the head lamps 15 and 16 remain unlighted. Also, since the contact "OFF" is open and the up contacts T19u and T20u are in contact with the insulating portions 19i and 20i, respectively, the first and second loop circuits remain deenergized. Thus, the driving motors M1 and M2 remain stopped.

Then, when the lighting operating lever is switched to the "H" position, the contact T and the contact H are grounded whereby the head lamp relay 6 is actuated to light the low-beam lamps 15l and 16l of the head lamps 15 and 16. The tail lamp 12 remains lighted. At this time, when the dimmer operating lever is swtiched to the "HU" position, the contact HU is grounded whereby the dimmer relay 13 is actuated to light the high-beam lamps 15u and 16u of the head lamps 15 and 16. When the dimmer operating lever is alternately switched to the "HL" and "HF" positions, the high-beam lamps 15u and 16u and the low-beam lamps 15l and 16l flicker alternately according to the switching operation. Since the first and second loop circuits are in a state of deenergization, the driving motors M1 and M2 remain stopped. At this time, since the cathode of the diode D5 in the light retractor control relay circuit 10 is grounded, a base bias is applied to the transistor Tr3 and the transistor Tr3 is then turned ON whereby a base bias is applied to the transistors Tr1 and Tr2, which are then turned ON. When the transistor Tr2 is turned ON, the relay 21 is actuated to open the contact T21. The contact T21 is in an open state while the lighting operating lever assumes the "H" position and is returned to its closed state in a predetermined period of time after the lighting operating lever has been released from the "H" position. When the lighting operating lever is returned to the "T" position, the contact H is opened and the contact "T" and the contact "UP" are grounded whereby the head lamps 15 and 16 are turned off.

Next, when the lighting operating lever is returned to the "UP" position, the contact "T" is open and the contact "UP" is grounded, as a consequence of which the tail lamp 12 is turned off. Even if the contact "UP" is grounded, the up contacts T19u and T20u are in contact with the insulating portions 19i and 20i and therefore, the second loop circuit is in a state of deenergization and thus the driving motors M1 and M2 are not actuated.

When the lighting operating lever is returned to the "OFF" position, the contact "UP" is open and the contact "OFF" is grounded. As a consequence, the first loop circuit becomes energized and the driving motors M1 and M2 start to conceal the head lamps 15 and 16. At the same time, the sliding plates 19s, 20s and the sliding plates 17s, 18s are rotated halfway to cause the insulating portions 19i and 20i to come into contact with the down contacts T19d and T20d and to cause the contacts T17a and T18a to come into contact with the insulating portions 17i and 18i. As a consequence, the first loop circuit becomes deenergized and thus the driving motors M1 and M2 stop.

Then, when the lighting operating lever is at the "OFF" position, the dimmer operating lever may be switched momentarily from the "HL" position to the "HF" position to cause the head lamps 15 and 16 to go into a mode appropriate for when the vehicle is passing another vehicle. That is, when the dimmer operating lever is switched to the "HF" position, both the contacts HF1 and HF2 are grounded, and therefore, the cathode of the diode D5 of the light retractor control relay circuit 10 is grounded to turn on the transistors Tr1, Tr2 and Tr3. Since the cathodes of the diodes D3 and D4 are grounded by turning on of the transistor Tr1, the same condition as that when the lighting operating lever is switched from the "OFF" position to the "UP" position whereby the driving motors M1 and M2 start to expose the head lamps 15 and 16. At this time, the contacts HF1 and HF2 are grounded and thus the head lamp relay 6 and the dimmer relay 13 are actuated to turn on the head lamps 15u and 16u. When the driving motors M1 and M2 are actuated, the contacts T19c, T20 and the down contacts T19d, T20d become energized, but when the transistor Tr2 is turned ON, the relay 21 is actuated whereby the contact T21 becomes open. Accordingly, the first loop circuit becomes deenergized to stop driving of the driving motors M1 and M2. Even after the dimmer operating lever is returned to the "HL" position to open the contacts HF1 and HF2, the transistor Tr3 remains in its ON state for a predetermined period of time (about 2 to 4 seconds) by the charged charges in the capacitors C1 and C3. Therefore, if the dimmer operating lever is reciprocatively switched from the "HL" position to the "HF" position during said period of time, the head lamp relay 6 and the dimmer relay 13 are simultaneously turned ON and OFF according to such an operation to alternately flicker the high-beam lamps 15u and 16u of the head lamps 15 and 16.

In a predetermined period of time (about 2 to 4 seconds) after termination of passing mode by the dimmer operating lever (the contacts HF1 and HF2 are open), the transistors Tr1, Tr2 and Tr3 are turned OFF whereby the relay 21 stops its operation to close the contact T21. This assumes the same condition as that when the lighting operating lever is switched from the "UP" position to the "OFF" position and the retractor motors M1 and M2 start to conceal the head lamps 15 and 16, after which the driving motors M1 and M2 are stopped.

Even if the lighting operating lever is returned at one stroke from the "H" position to the "OFF" position, the contact T21 of the relay 21 does not close unless a predetermined of time has passed, and therefore, the driving motors M1 and M2 are driven after the head lamps 15, 16 and the tail lamp 12 are turned off and the residual lights of the head lamps 15 and 16 are extinguished, whereby the head lamps 15 and 16 are concealed.

Next, in a state where the head lamps 15 and 16 are concealed with the lighting operating lever switched to the "OFF" position, a contact T24c of an antifreezing hand switch 24 is switched towards a contact T24b. In this condition, when an ambient temperature of the vehicle is below a set level of a temperature sensitive switch 25, the contact of the temperature sensitive switch 25 is closed and accordingly, the second loop circuit becomes energized and the lighting operating lever assumes the same condition as that when the latter is switched to the "UP" position whereby the head lamps 15 and 16 are driven to be exposed. At this time, the contacts T17a and T18a of the light switches 17 and 18 are in contact with the sliding plates 17s and 18s and therefore, if the lighting operating lever is moved to the "H" position, the head lamps 15 and 16 may be lighted.

After the head lamps have been exposed automatically, all the circuits are in a state of deenergization and therefore, the battery is never wasted.

It should be understood that the present embodiment may also be applied to an arrangement wherein the retractor motor is normally or reversely rotated or to an arrangement wherein a cover for covering the head lamp body is driven by the retractor motor.

As described above, in accordance with the concealed type head lamp device of the present invention, a single operating lever may be operated to perform the operation of turning on and off, concealing and exposing, and operating the head lamps during passing, and even if the head lamps are switched at one stroke from the turn-on state to the turn-off state and vice versa, a dazzling beam is not given out towards the facing vehicle. In addition, even if the head lamps are left concealed, the head lamps may be exposed automatically before being frozen. Moreover, when an attempt is made to turn on the head lamps, the head lamps may be exposed because the lever goes through the "UP" position, but it does not come to nothing. Conversely, if the lever is switched to the "H" position, the head lamps are instantly turned on and illuminated. Further, even if the head lamps are temporarily turned off, the head lamps remain exposed unless the lever is returned to the "OFF" position and accordingly, the lamps can be turned on again instantly. Thus, where the head lamps are left exposed, for example, during car-washing, the head lamps can still be maintained in their off state.

It should be apparent to one skilled in the art that the abovedescribed embodiments are merely illustrative of but a few of many possible specific embodiments of the present invention. Numerous and varied other arrangements can be readily devised by those skilled in the art without departing from the spirit and scope of the invention.

We claim:

1. A concealed type head lamp device comprising:
   head lamps movably disposed on a vehicle body for movement between concealed and exposed positions;
   a head lamp lighting circuit for controlling turning on and off said head lamps;
   a motor for driving said head lamps between said concealed and exposed positions;
   a motor driving circuit for controlling the operation of said motor; and
   a single lighting switch, for operating said head lamp lighting circuit and said motor driving circuit, said single lighting switch being selectively switchable to any one of a first operating position where said head lamps are turned off and brought to and maintained in said concealed position, a second operating position where said head lamps are turned off and brought to and maintained in said exposed position, and a third operating position where said head lamps are turned on and brought to and maintained in said exposed position.

2. A concealed type head lamp device according to claim 1, wherein said head lamp lighting circuit comprises:
   a light switch connected in series with said head lamps and closed in response to said head lamps being in said exposed position; and
   a first relay switch connected in series with said head lamps and closed, through an excitation of a first relay coil connected to said lighting switch, when said lighting switch is at said third operating position so that said head lamps are turned on; and
   said motor driving circuit comprising:
   a second relay switch connected to and energizing said motor when closed through the excitation of an associated second relay coil; and
   a retractor switch having a first contact connected to said second relay coil, an up contact connected to said lighting switch for grounding when said lighting switch is in either one of said second and third operating positions and a down contact connected to said lighting switch for grounding when said lighting switch is in said first operating position, said first contact and said up contact being interconnected at least when said head lamps are concealed, said first contact and said up contact being separated when said head lamps are exposed, said first contact and said down contact being interconnected at least when said head lamps are exposed and said first contact and said down contact being separated when said head lamps are concealed; whereby
   when said lighting switch is switched from the first operating position to either one of the second and third operating positions, current flows through said second relay coil, said first contact, said up contact and said lighting switch to drive said motor for exposing the head lamps until said head lamps are in said exposed position at which time said first contact and said up contact are separated to stop the driving of said motor; and when said lighting switch is switched from either one of the second and third operating positions to the first operating position, current flows through said second relay coil, said first contact, said down contact and said lighting switch to drive said motor for concealing the head lamps until said head lamps are in said concealed position at which time said first contact and said down contact are separated to stop the driving of said motor.

3. A concealed type head lamp device according to claim 1, further comprising a delay circuit, connected to said motor driving circuit and said lighting switch, for closing said motor driving circuit after a lapse of a predetermined period of time upon switching of said lighting switch from the third operating position to the first operating position, whereby the exposed head lamp starts to move into its concealed state after a lapse of a predetermined period of time upon turning off of the head lamps.

4. A concealed type head lamp device according to claim 2, further comprising a delay circuit including:
- a first switch selectively interconnecting said down contact and said lighting switch, said first switch being opened when said lighting switch is at the third operating position and closed after a predetermined period of time upon a switching of said lighting switch from the third operating position to the first operating position; and
- a second switch selectively interconnecting said up contact and ground said second switch being closed when said lighting switch is at the third operating switch and opened when said lighting switch is at one of the first and second operating positions;

wherein said up contact is directly grounded through said lighting switch when said lighting switch is at the second operating position and grounded through said second switch for the delay circuit when the lighting switch is at the third operating position, and said down switch is at the third operating position, and said down contact is grounded through said lighting switch and said first switch when said lighting switch has been at the first operating position for said predetermined period after leaving said third operating position.

5. A concealed type head lamp device according to claim 1, wherein said device further comprises:
- a passing switch provided in parallel to said lighting switch, having two positions including a normal position where said head lamps are turned off and in said concealed position and an operating position where said head lamps are turned on and in said exposed position, said passing switch adapted to be manually switched into said operating position; and
- a delay circuit for actuating said motor driving circuit after a predetermined period of time upon a return of said passing switch from the operating position to the normal position;

whereby said exposed head lamps are concealed after a predetermined period of time upon turning off of said head lamps.

6. A concealed type head lamp device according to claim 5, wherein said delay circuit comprises:
- a first switch opened when said passing switch is at the operating position and closed after a predetermined period of time upon a switching of said passing switch from the operating position to the normal position; and
- a second switch closed when said passing switch is at the operating position;

said head lamp lighting circuit comprising:
- a light switch connected in series with said head lamps and closed in response to said head lamps being in said exposed position, and
- a first relay switch and a high beam relay switch connected in series with said head lamps and closed, through the excitation of a first relay coil and a high beam relay coil each connected to said passing switch, when said passing switch is at the operating position so that said head lamps are turned on with a high beam; and said motor driving circuit comprises:
- a second relay switch connected to and energizing said motor when closed through excitation of an associated second relay coil; and
- a retractor switch having a first contact connected to said second relay coil, an up contact connected to said passing switch for grounding when said passing switch is at the operating position and a down contact connected to said passing switch for grounding when passing switch is at the normal position, said first contact and said up contact being interconnected at least when said head lamps are concealed, said first contact and said up contact being separated when said head lamps are exposed, said contact first and said down contact being interconnected at least when said head lamps are exposed and said first contact and said down contact being separated when said head lamps are concealed;

whereby:
when said lighting switch is at the first operating position, if said passing switch is switched from the normal position to the operating position, then current flows through said second relay coil, said first contact, said up contact, said second switch and said passing switch to drive said motor for exposing the head lamps until said head lamps are in said exposed position at which time said first contact and said up contact are separated to stop the driving of said motor; and when said passing switch is switched from the operating position to the normal position, said first relay switch and said high beam relay switch are opened to turn off the head lamps and current flows through the second relay coil, said first contact, said down contact, said first switch and said passing switch to drive said motor for concealing the head lamps, in response to the closing of the first switch after a predetermined period of time upon the switching operation.

7. A concealed type head lamp device according to claim 1, further comprising a temperature sensitive switch provided in parallel with said lighting switch and closed when the ambient temperature around a vehicle becomes lower than a preset level to thereby close said motor driving circuit to drive said head lamps to said exposed position.

8. A concealed type head lamp device according to claim 7, wherein said motor driving circuit comprises:
- a relay switch connected to and energizing said motor when closed through the excitation of an associated relay coil; and a retractor switch having a first contact connected to said relay coil, an up contact connected to said lighting switch and to said temperature sensitive switch for grounding when either said lighting switch is in the second operating position or when said temperature sensitive switch is closed, and a down contact connected to said lighting switch for grounding when said lighting switch is in the first operating position, said first contact and said up contact being interconnected at least when said head lamps are concealed, said first contact and said up contact being separated when said head lamps are exposed, said first contact and said down contact being interconnected at least when said head lamps are exposed and said first contact and said down contact being separated when said head lamps are concealed;

whereby:

when said lighting switch is switched from the first operating position to the second operating position, current flows through said second relay coil, said first contact, said up contact and said lighting switch to drive said motor for exposing the head lamps until said head lamps are in said exposed position at which time said first contact and said up contact are separated to stop the driving of said motor;

when said lighting switch is switched from the second operating position to the first operating position, current flows through said second relay coil, said first contact, said down contact and said lighting switch to drive said motor for concealing the head lamps until said head lamps are in said concealed position at which time said first contact and said down contact are separated to stop said motor; and when said lighting switch is at the first operating condition and said temperature sensitive switch is closed, then current flows through said second relay coil, said first contact, said up contact and said temperature sensitive switch to drive said motor to cause the head lamps to assume the exposed position while they are turned off.

9. A concealed head type lamp device comprising:

head lamps movably disposed on a vehicle body for movement between concealed and exposed positions;

a head lamp lighting circuit for controlling turning on and off said head lamps;

a motor for driving said head lamps between said concealed and exposed positions;

a motor driving circuit for controlling the operation of said motor;

at least single manual switching means for operating said head lamp lighting circuit and said motor driving circuit; and a temperature sensitive switch provided in parallel with said manual switching means and closed to actuate said motor driving circuit when the ambient temperature around a vehicle becomes lower than a preset level so that the head lamps are brought to said exposed position while said head lamps are turned off.

* * * * *